United States Patent
Mouard et al.

(10) Patent No.: US 11,062,662 B2
(45) Date of Patent: Jul. 13, 2021

(54) VEHICLE INSTRUMENT CLUSTER PROVIDED WITH A MONOCHROMATIC DISPLAY

(71) Applicant: MARELLI EUROPE S.p.A., Corbetta (IT)

(72) Inventors: Sylvain Mouard, Magenta (IT); Salvatore Ingrassia, Milan (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/063,917

(22) PCT Filed: Dec. 22, 2016

(86) PCT No.: PCT/IB2016/057949
§ 371 (c)(1),
(2) Date: Jun. 19, 2018

(87) PCT Pub. No.: WO2017/109754
PCT Pub. Date: Jun. 29, 2017

(65) Prior Publication Data
US 2019/0355315 A1  Nov. 21, 2019

(30) Foreign Application Priority Data
Dec. 22, 2015  (IT) .................. 102015000086666

(51) Int. Cl.
*G09G 3/34* (2006.01)
*B60K 35/00* (2006.01)
(52) U.S. Cl.
CPC .......... *G09G 3/3426* (2013.01); *B60K 35/00* (2013.01); *B60K 2370/167* (2019.05); *B60K 2370/33* (2019.05); *G09G 2380/10* (2013.01)

(58) Field of Classification Search
CPC .. G09G 3/3426; G09G 2380/10; B60K 35/00; B60K 2370/167; B60K 2370/33
See application file for complete search history.

(56) References Cited

U.S. PATENT DOCUMENTS 4,236,480 A * 12/1980 Grohl .................... B60K 35/00
                                                      116/286
4,975,807 A * 12/1990 Ohashi .................. B60K 37/02
                                                      362/23.16

(Continued)

FOREIGN PATENT DOCUMENTS

DE  102009040314 A1  3/2011
WO      8803663 A1  5/1988

OTHER PUBLICATIONS

International Search Report and Written Opinion of the International Searching Authority for PCT International Application No. PCT/IB2016/057949 dated Aug. 1, 2017.

(Continued)

*Primary Examiner* — Chad M Dicke
(74) *Attorney, Agent, or Firm* — Howard & Howard Attorneys PLLC

(57) ABSTRACT

A vehicle instrument cluster including a monochromatic display having a matrix of pixels which can be independently controlled by a control unit to inhibit or to allow the passage of light. The instrument cluster has a back-lighting device that emits at least a monochromatic light beam toward a rear surface of the display and through a filter, which is light-permeable and is provided with a coloured graphic representation whose contours have a resolution higher than the one of the display.

8 Claims, 2 Drawing Sheets

(56) References Cited

U.S. PATENT DOCUMENTS

| | | | |
|---|---|---|---|
| 5,063,379 A | 11/1991 | Fabry et al. | |
| 5,815,072 A * | 9/1998 | Yamanaka | B60K 35/00 340/438 |
| 5,949,346 A * | 9/1999 | Suzuki | B60K 37/02 340/815.45 |
| 6,014,121 A * | 1/2000 | Aratani | G06T 3/4015 345/89 |
| 6,891,672 B2 * | 5/2005 | Whitehead | G03B 21/60 359/443 |
| 6,926,432 B2 * | 8/2005 | Rodriguez Barros | B60Q 1/2665 362/494 |
| 9,135,864 B2 * | 9/2015 | Shields | G09G 3/3406 |
| 10,500,957 B2 * | 12/2019 | Jaber | B60Q 3/85 |
| 10,527,770 B2 * | 1/2020 | Bergquist | G02F 1/133606 |
| 2008/0252664 A1 * | 10/2008 | Huang | G09G 3/3413 345/690 |
| 2008/0297439 A1 * | 12/2008 | Repetto | B60K 35/00 345/32 |
| 2012/0069594 A1 * | 3/2012 | Nomura | G01D 11/28 362/516 |
| 2012/0139429 A1 * | 6/2012 | Masuda | B60K 35/00 315/192 |
| 2013/0128587 A1 * | 5/2013 | Lisseman | H03K 17/9638 362/276 |
| 2014/0049571 A1 * | 2/2014 | Erinjippurath | G02F 1/133606 345/690 |
| 2014/0293188 A1 * | 10/2014 | Chen | G09G 3/3426 349/65 |
| 2015/0228089 A1 * | 8/2015 | Perdices-Gonzalez | G09G 3/348 345/592 |
| 2016/0300535 A1 * | 10/2016 | Gilbert | G09G 3/36 |
| 2017/0021727 A1 * | 1/2017 | Mouard | B60K 37/02 |
| 2018/0011315 A1 * | 1/2018 | Kamiyama | G02B 27/0101 |
| 2018/0366074 A1 * | 12/2018 | Choi | G09G 3/3607 |
| 2019/0001870 A1 * | 1/2019 | Laluet | B32B 17/10348 |
| 2019/0073055 A1 * | 3/2019 | Nakai | B32B 15/06 |

OTHER PUBLICATIONS

Applicant's Request for Preliminary Examination dated Oct. 30, 2017 and Article 34 Amendment dated Nov. 28, 2017 for PCT International Application No. PCT/IB2016/057949.

Second Written Opinion of the International Preliminary Examining Authority for PCT International Application No. PCT/IB2016/057949 dated Jan. 2, 2018.

Applicant's Reply to the Second Written Opinion of the International Preliminary Examining Authority for PCT International Application No. PCT/IB2016/057949 dated Feb. 27, 2018.

International Preliminary Report on Patentability for PCT International Application No. PCT/IB2016/057949 dated Apr. 3, 2018.

* cited by examiner

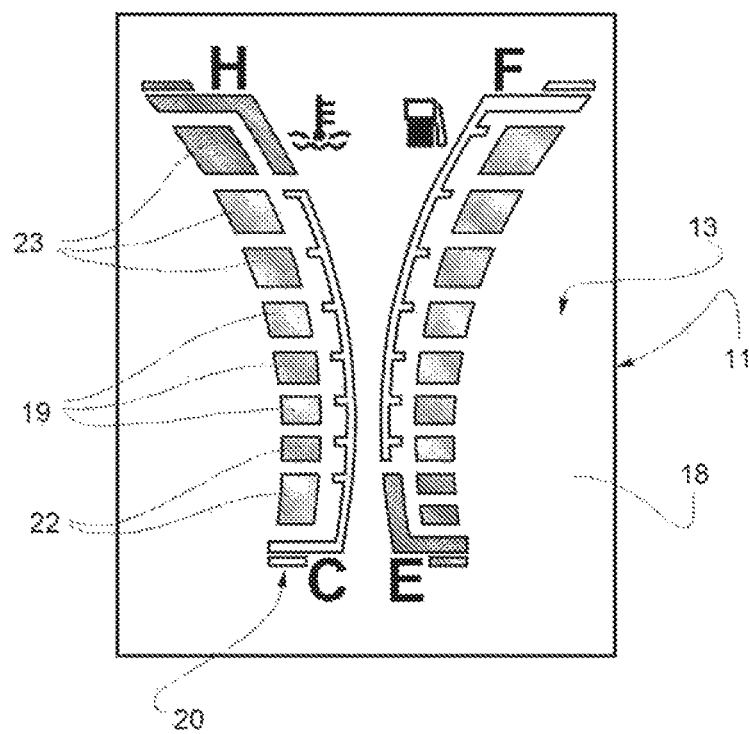
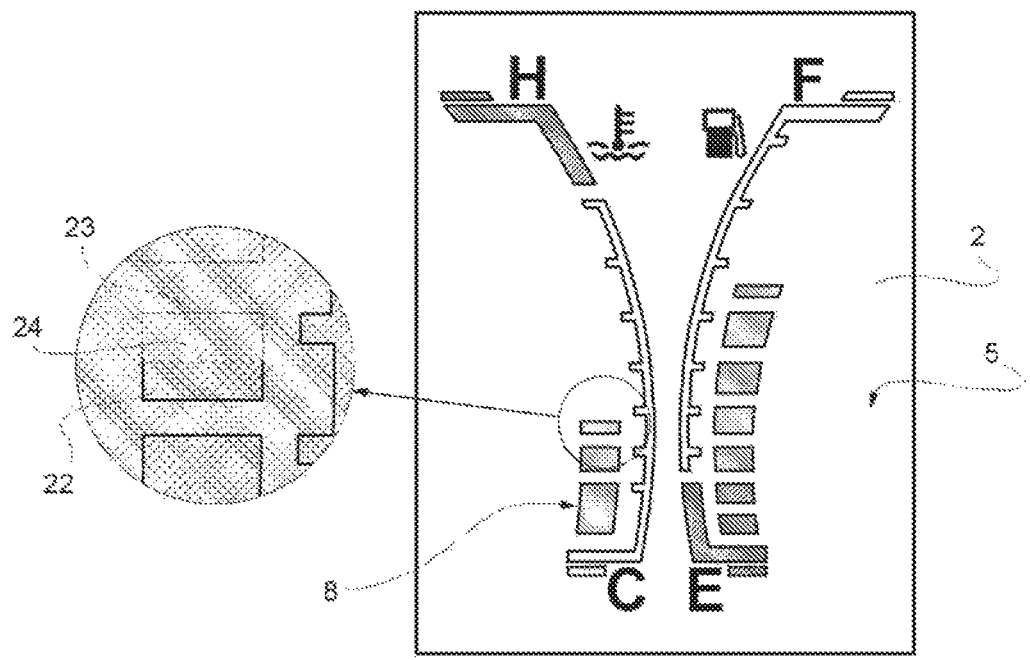

VEHICLE INSTRUMENT CLUSTER PROVIDED WITH A MONOCHROMATIC DISPLAY

TECHNICAL FIELD

The present invention relates to a vehicle instrument cluster provided with a monochromatic display comprising a matrix of pixels, which can be independently controlled by a control unit to inhibit or allow the passage of light, which is emitted by a back-lighting device arranged behind the display.

BACKGROUND ART

In the prior art solutions, the back-lighting device is of the multicolour type in order to obtain graphic areas illuminated with different colours on the front surface of the display. In other words, when the controlled pixels transmit the light, this latter is visually perceived in the passenger compartment like differently coloured graphic areas on the front surface of the display.

In the case of direct lighting back-lighting devices, i.e. with no reflections and/or light guides, these devices comprise LEDS of different colours, arranged in respective cavities, whose size is suitably set for illuminating different areas of the display and which are separated by walls that allow isolating a colour from those of the adjacent cavities. In order to ensure an even diffusion of the light emitted through the front surface of the display, said side walls are not in contact with the display, but are spaced apart.

Then, some solutions provide a diffusion filter arranged between the back-lighting device and the display.

Solutions of the aforesaid type are unsatisfactory due to a series of drawbacks.

First, between two adjacent cavities housing differently coloured LEDS of the back-lighting device, there is normally a leakage of light, and therefore a colour contamination, because of the empty space provided between the display and the walls separating the cavities. Overcoming this drawback would require a minimum distance between two adjacent differently coloured cavities by appropriately sizing the thickness of the partition walls. However, this would lead to another drawback, namely that quite close differently coloured illuminated graphic areas could not be obtained. For example, in the case of a graphic scale or "bar graph" to be shown on the display, it is not possible to obtain a continuous effect between adjacent cells of the light bar defining this graphic scale.

Moreover, the definition or quality of the contours of the light image visually perceived by the driver essentially depends on the display resolution and/or the size of the pixels in the display matrix, so that its limit is given by the display design characteristics. For example, the pixel size is defined through the magnitude called "pixel pitch" or "dot pitch" that is about 0.22×0.22 [mm] in common LCD displays. Perceiving light images without a stepped contour would require a matrix of pixel with a higher resolution, i.e. a smaller "pixel pitch" with the same display size, consequently involving significant costs.

DE102009040314A1 corresponds to the preamble of claim 1 and describes a solution providing coloured filters to obtain areas of a single colour in a display area.

DISCLOSURE OF INVENTION

The object of the present invention is to provide a vehicle instrument cluster provided with a monochromatic display, which allows solving the above problems in a simple and inexpensive way.

According to the present invention, it is provided a vehicle instrument cluster provided with a monochromatic display as defined in claim 1.

BRIEF DESCRIPTION OF THE DRAWINGS

The invention will now be described with reference to the accompanying drawings showing a non-limiting embodiment wherein:

FIG. 2 is a plan view showing a graphic representation on a component of the instrument cluster of FIG. 1; and FIG. 3 shows a light image visible on the display of the instrument cluster of FIG. 1 at the graphic representation of FIG. 2.

BEST MODE FOR CARRYING OUT THE INVENTION

Figure 1:
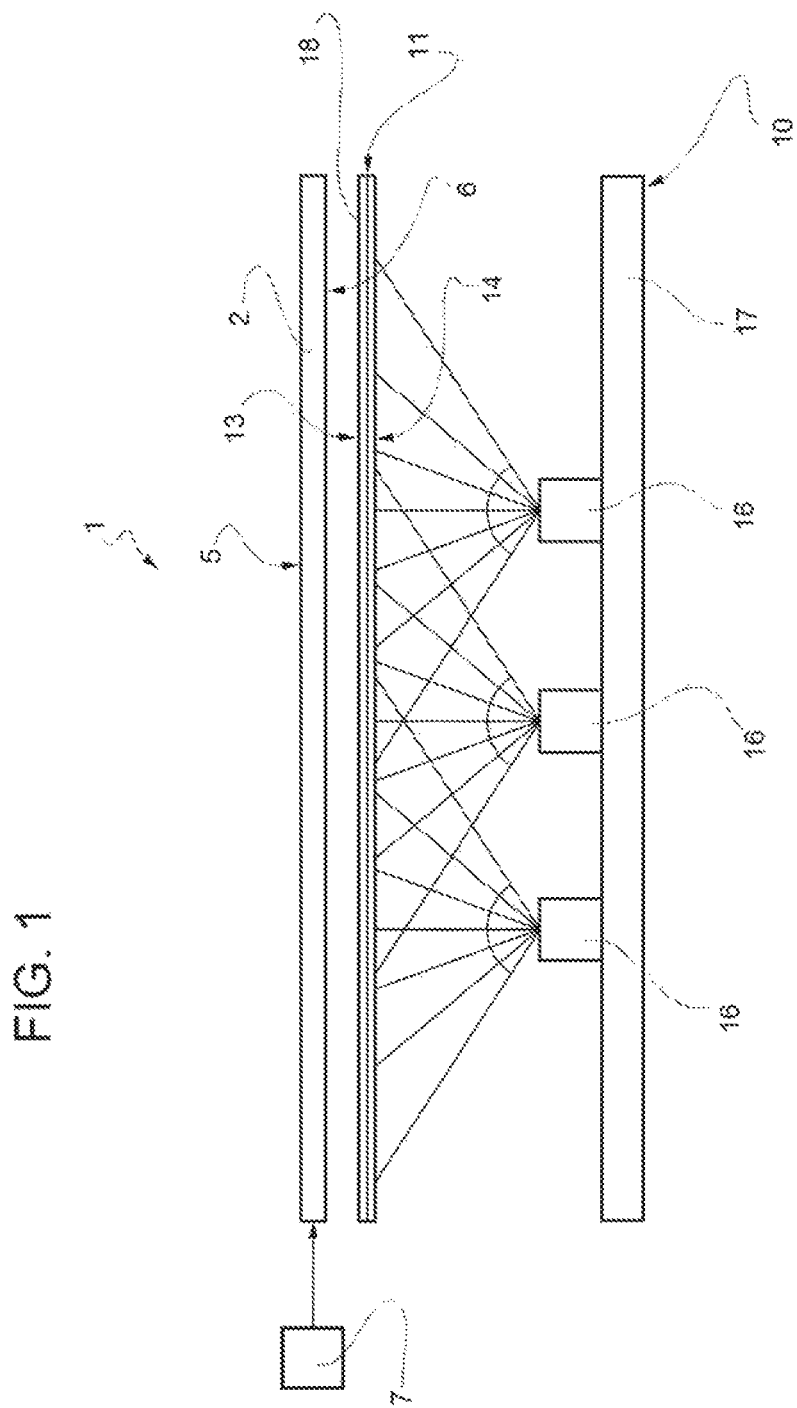
FIG. 1 is a diagram showing a cross section of a preferred embodiment of the vehicle instrument cluster provided with a monochromatic display according to the present invention.

In FIG. 1, the reference number 1 indicates a vehicle instrument cluster (schematically shown) comprising a monochromatic display 2 having a front surface 5, visible from the outside, i.e. from the passenger compartment of the vehicle, and a rear surface 6 opposite to the surface 5, i.e. directed toward the inside of the instrument cluster 1. The display 2 is of a type known per se, for example an LCD display of the TFT type, and comprises a matrix of pixels which can be independently controlled by a control unit 7 (schematically shown) to allow or inhibit the passage of light from the surface 6 to the surface 5. By switching on, at the pixels that are operated to transmit the light, the surface 5 shows graphic areas or light images, in particular to provide to the driver the corresponding information on the operation and/or the condition of the vehicle. These light images can form graphic scales (also called "bar graphs"), continuous or discontinuous bars, marks, numbers, logos, letters, etc. One of these light images is shown by way of example in FIG. 3 and is indicated by the reference number 8.

With further reference to FIG. 1, the instrument cluster 1 also comprises a back-lighting device 10 and a filter 11, which is interposed between the device 10 and the surface 6 and, in particular, has a surface 13 directly facing the surface 6 and a surface 14 directly facing the device 10 for receiving at least one light beam. According to a preferred aspect of the present invention, the device 10 is monochromatic, i.e. is designed to emit light of a single colour toward the surface 14. In the particular example shown, the device 10 is of the direct lighting type, i.e. it comprises at least a light source 16, for example a LED, which directly illuminates the surface 14. In particular, the device 10 comprises a support plate 17, defined in particular by a printed circuit (also indicated by the acronym PCB), and a plurality of light sources 16, defined by LEDs supported by the plate 17 in fixed positions and emitting a light of the same colour. Advantageously, the light sources 16 are arranged in adjacent positions in a single cavity, with no partition wall between the light sources 16.

According to variants not shown, the device 10 is of the indirect lighting type and has, for instance, a light guide facing the surface 14 for transmitting and emitting light coming from one or more remote light sources.

With reference to FIG. 2, the filter 11 comprises a sheet or film 18 made of a material that is light-permeable (transparent or semi-transparent) at one or more portions 19.

According to an aspect of the present invention, the filter 11 defines at least a graphic representation with different colours, generally indicated by the reference number 20 in FIG. 2. The graphic representation 20 corresponds, completely or partially, to the light image 8 (FIG. 3), which is perceived as coloured, with exactly the same colours and the same contours of the graphic representation 20 provided on the filter 11 arranged below the surface 6. In the example shown, the graphic representation 20 comprises at least a part 22 crossed by the light that actually forms the light image 8 and at least a part 23 crossed by the light that remains hidden by the pixels maintained in an off state by the unit 7, i.e. by the pixels that are controlled by the unit 7 to inhibit the passage of light.

Preferably, the different colours of the graphic representation 20 are defined by one or more coloured coatings, for example inks, applied on at least one of the surfaces 13 and 14 of the sheet 18, at the portions 19 that are light-permeable. Advantageously, the different colours are defined by serigraphs, which in particular are applied only on the surface 14.

Alternatively, the portions 19 of the sheet 18 are formed by bulk-coloured materials, with or without additional coloured coatings on the surfaces 13 and 14.

According to a further aspect of the present invention, the control unit 7 is configured by means of suitable control logics in order to drive the pixels of the display 2 based on the graphic representation 20 provided on the filter 11 and based on the specific information to be supplied to the driver, in order to vary in time the shape and/or the size of the light image 8 and then provide the requested information. In more detail, the control unit 7 is configured to keep switched on those pixels that are arranged at the part 22 that must be visible on the surface 5 at a given instant of time to form the light image 8 and to provide the corresponding information to the driver; at the same time, the control unit 7 is configured to keep switched off those pixels that are arranged at the part 23 that is not necessary to form the light image 8 and therefore must not be visible on the surface 5 at a given instant of time.

In particular, it is possible to display a graphic scale or "bar graph" on the surface 5, i.e. display a light image 8 defined by a bar having a length, which is variable based on the amount of pixels on or off and which provides the driver with a variable information in time (based on the driving conditions, the state of the vehicle, the measurement of a vehicle operation magnitude, etc.). With the passing of time, the length of the bar can be varied by switching the pixels between the on/off states.

Thus, the pixels of the display 2 are not operated to define the contours and/or the colours of the light image 8, since these contours and/or colours are defined by the graphic representation 20 on the filter 11. The pixels are rather operated to hide more or less the graphic representation 20, in order to form the light image 8 to be displayed at a given instant of time.

From the foregoing it is evident how the instrument cluster 1 allows to obtain light images 8 wherein adjacent differently coloured areas may be very close without causing any light leakage and colour mixing between these areas. In fact, these coloured areas are essentially defined by the filter 11, namely by the style and quality of the graphic representation 20, and not by the structural characteristics of the device 10 evenly illuminating the filter 11. In other words, if the graphic representation 20 has a plurality of coloured areas with sharp contours, even if very close, the light image 8 will also have close coloured areas with sharp contours and with no colour mixing.

Moreover, when it is necessary to display a graphic scale or "bar graph" on the surface 5, the driver perceives the light bar as if it were almost continuous, even if this bar has differently coloured areas, which are relatively close. Furthermore, the instrument cluster 1 can use light sources 16 having the same colour, with no partition wall between a light source and the other to obtain a considerable constructive simplification in the device 10 and to contain the costs compared to the known solutions providing a device 10 having a plurality of differently coloured LEDS. According to the present invention, light images 8 are obtained with contours having a resolution higher than the one of the matrix of pixels of the display 2. As mentioned above, the resolution of the light images 8 depends on the resolution of the graphic representation 20 on the filter 11. At the same time, as already known, the higher the resolution, the smaller the size of the pixels. By way of example, a print resolution of 300 PPI ("pixels per inch") allows to obtain a pixel size, also called "pixel pitch", of about 0.08 [mm], that is smaller than the "pixel pitch" of the common LCD displays (about 0.22 [mm]).

In fact, the pixels of the display 2 are used to mask or hide the parts 23 of the graphic representation 20 that must not be visible on the surface 5, and are not used to form the contours of the light image 8, except for an edge 24 (visible in the enlargement in FIG. 3) that corresponds to an ideal partition line between the parts 22 and 23. Then low resolution displays can be used, namely displays that have relatively large pixels and which therefore involve relatively low costs while maintaining a high resolution and then a good quality or definition for the contours of the image 8.

Finally, it is evident that the instrument cluster 1 described with reference to the attached figures may be subject to modifications and variants which do not depart from the scope of protection of the present invention as defined in the appended claims.

In particular, the specific shape and/or colours selected to obtain the graphic representations 20 on the filter 11 are definitely not relevant.

Moreover, the display 2 could have more than one matrix of pixels; and/or an additional filter could be provided between the display 2 and the device 10 to add special optical effects, e.g. a light diffusion effect.

The invention claimed is:

1. A vehicle instrument cluster comprising:
   a control unit;
   a controllable monochromatic display comprising a matrix of pixels defining a first resolution of the monochromatic display; said monochromatic display having a rear surface and a front surface opposite to each other;
   a back-lighting device configured to emit uniform light toward said rear surface;
   a filter arranged between said back-lighting device and said rear surface and comprising at least one light-permeable portion;
   a physical image formed on the light permeable portion in a permanent manner, the physical image having contours and different colours;
   wherein each of said pixels is independently controllable by the control unit to inhibit the passage of the light being emitted from the back-lighting device and passed through the physical image of the light permeable portion or to allow the passage of the light being emitted from the back-lighting and passed through the physical image of the light permeable portion so as to form, on said front surface, a multi-coloured displayed image defined by the light passed through the pixels and by the physical image on the light permeable portion of the filter;

wherein the contours of the physical image of the light permeable portion have a second resolution higher than the first resolution of the pixels of the monochromatic display and cause the displayed image to have a third resolution equal to the second resolution.

2. The instrument cluster according to claim 1, wherein said back-lighting device is monochromatic.

3. The instrument cluster according to claim 2, wherein said back-lighting device comprises at least one light source arranged so as to directly illuminate said filter.

4. The instrument cluster according to claim 3, wherein said back-lighting device comprises a plurality of light sources of the same colour, which are arranged in a single cavity.

5. The instrument cluster according to claim 1, wherein the light permeable portion comprises a light permeable sheet or film; the image being defined by a coating applied on at least one surface of the light permeable sheet or film.

6. The instrument cluster according to claim 5, wherein the coating is defined by a serigraphy on said light permeable sheet or film.

7. The instrument cluster according to claim 1, wherein the light permeable portion comprises a light permeable sheet or film, which has a plurality of portions formed by bulk-coloured materials; said portions defining the image.

8. The instrument cluster according to claim 1, wherein the displayed image has further contours that are not defined by controlling the pixels but that are defined by at least a portion of the contours of the physical image.

* * * * *